(Model.)
M. CONNELLY.
Petroleum Products and Process of Obtaining and Deodorizing the Same.
No. 240,094. Patented April 12, 1881.
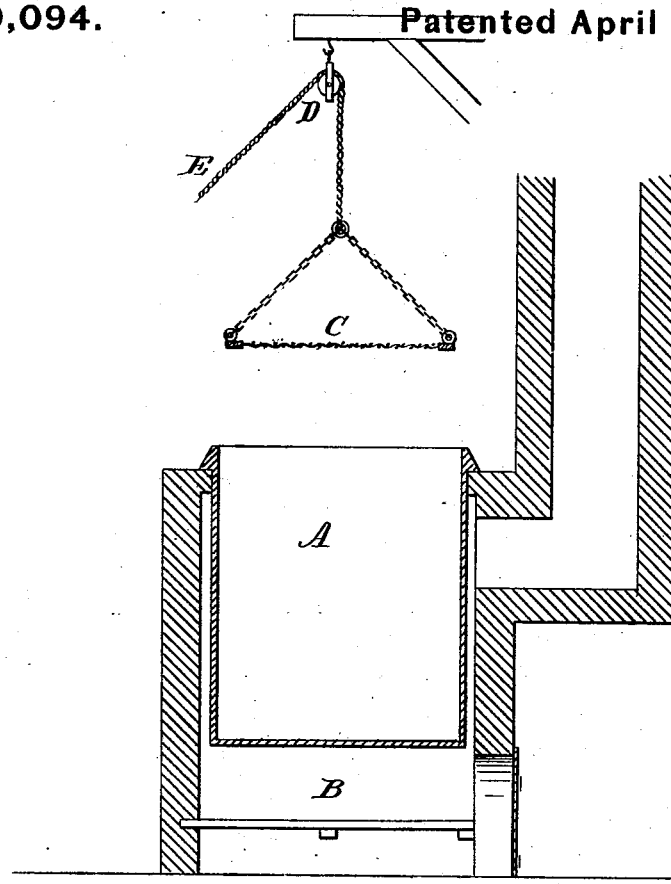
Witnesses:
H. W. Low
L. H. Marshall.
Inventor:
Martin Connelly
by Doubleday & Bliss
assoc. attys

UNITED STATES PATENT OFFICE.

MARTIN CONNELLY, OF PHILADELPHIA, PENNSYLVANIA.

PETROLEUM PRODUCTS AND PROCESS OF OBTAINING AND DEODORIZING THE SAME.

SPECIFICATION forming part of Letters Patent No. 240,094, dated April 12, 1881.

Application filed August 28, 1880. (Specimens.)

*To all whom it may concern:*

Be it known that I, MARTIN CONNELLY, a citizen of Philadelphia, residing at Philadelphia, in the county of Philadelphia and State of Pennsylvania, have invented certain new and useful Improvements in Petroleum Products and Process for Obtaining and Deodorizing the Same; and I do hereby declare the following to be a full, clear, and exact description of the invention, such as will enable others skilled in the art to which it appertains to make and use the same, reference being had to the accompanying drawing, and to letters or figures of reference marked thereon, which form a part of this specification.

This invention relates to a novel product obtained from crude petroleum in its natural state—that is, the state in which it is obtained from the wells.

The invention relates, also, to a novel method of deodorizing crude petroleum, and so preparing it that it can be used as a substitute for linseed-oil and other similar oils in the various arts and manufactures in which such oils are largely used.

Heretofore it has been customary to reduce petroleum by fractional distillation in retorts or closed vessels, and afterward to deodorize the distillates and residuum (or one or more of them) separately by means of sulphuric acid and soda or potassa, or other alkaline agent, and subsequently washing with water, and many of the products thus obtained have been employed as substitutes for linseed-oil and other oils in the manufacture of paints, inks, oil-cloths, &c. I have found that these products of petroleum, when thus used, are of an inferior character when employed in the manufacture of paints, inks, and similar compositions, inasmuch as the heavier products are too slow in drying, and the lighter are too volatile and have an insufficient body.

I have succeeded in obtaining, by means of the following process, a superior oil, to be used for all the purposes to which the ordinary oils are applied. In an open vessel of suitable size I place crude petroleum in the natural state in which it comes from the wells and heat it gradually up to 250° Fahrenheit, thus removing the gaseous and lighter vaporous hydrocarbons and all the water, which, as is well known, is mixed more or less with crude oil. It is essentially necessary that all the water should be driven off, as will hereinafter more fully appear. After the petroleum has been heated up to the last named degree, I then introduce unslaked lime and continue raising the heat until it reaches about 350° Fahrenheit, and I keep the mass at this temperature for about three hours, more or less. After it has been heated sufficiently long I withdraw the lime and all the calcined products that have been formed, and the oil is then ready for use.

The proportions which I generally find desirable are, substantially, eighteen hundred parts, by weight, of crude petroleum to twenty-seven parts of unslaked lime. In a charge convenient for handling properly there will be about eighteen hundred pounds of the petroleum to twenty-seven pounds of the unslaked lime. The unslaked lime should be very carefully prepared and of the best quality, and, as above said, before it is introduced to the petroleum, every trace of water should be removed therefrom, for if the lime be affected by water, either before or after its introduction, there is great danger of saponifying the material.

Another advantage which I accomplish is to so introduce the lime into the oil that it can be readily withdrawn at any time without the necessity of permitting it to settle as sediment and then withdraw the oil, as has been customary in previous processes. The lime is introduced in a supporting vessel or holder, and is suspended near the bottom, but not in contact with it or the sides of the vessel. The supporting device is of such character as to give the oil free access to the lime. This process results, on the one hand, in completely neutralizing the detrimental matters found in the heavier petroleum, retaining, however, those parts which are of advantage in forming a "body" for the deodorized oil, and, on the other hand, it results in removing the naphthas and undesirable portions of the lighter hydrocarbons, and yet retains sufficient of the desirable part of said lighter elements to give the oil a good drying capacity.

In the accompanying drawing there is shown a mechanism for the carrying out of my improved process.

In said drawing, A is an open caldron or kettle, which may be of any preferred style or size, and mounted over a fire-place, B, in any suitable manner. In this the oil is placed and heated, as hereinbefore described, until the proper time for introducing the unslaked lime. The lime is then introduced by placing it upon a wire support, C, arranged in any manner to permit it to be readily raised or lowered, as by means of a pulley, D, through which passes a rope, E, connected to the support C by means of wires or chains F, of suitable length. With these devices the lime can be made to pass through the entire body of the oil, and also can be so suspended as to avoid the necessity of mixing and agitating it with the oil, the support C being less in diameter than the caldron A, and being held at a short distance from the bottom thereof while the lime is being suspended therein. After the oil has been subjected to the action of the lime sufficiently long the latter can be instantly withdrawn by the lifting device described, so that it is not necessary to decant or draw off the oil by reason of a sediment having been formed, as is usual. This enables me to perform the whole operation of deodorizing and preparing the oil within three to four hours, an oil being produced at the expiration of that time which is of a very superior character for the purposes above described.

I am aware that crude oil has heretofore been treated with common salt, unslaked lime, saltpeter, and potash; also, that heavy hydrocarbon oils have been separated into their various constituents by means of filtration; also, that from heavy hydrocarbon oils there has been produced, by means of distilling, an oil having the smell of fatty oils, and I do not wish to be understood as claiming any of these processes, or the products obtained thereby; but I believe myself to be the first to have devised the hereinbefore-described simple and cheap process for obtaining from crude petroleum, without filtration and without distillation, a pure inodorous oil which, after the treatment thereof is completed, contains no saline nor acid ingredients, whereas the processes heretofore employed have necessitated much expense and time, or have resulted in products containing not only the oil, but also ingredients which would be disastrous in many of the arts to which my oil is applicable.

The oil which results from my process is readily distinguishable from those obtained by the now known processes hereinbefore alluded to. It is of a very dark brown color tinged with green and bronze. It is without the fatty smells characteristic of some of the oils that have heretofore been produced from petroleum. It is totally devoid of the saline or acid ingredients that necessarily remain, to a greater or less extent, in oils that have been treated with potash, salt, saltpeter, &c., or that have been treated with sulphuric acid and alkalies and water.

I do not in this application claim the process of purifying oil by introducing into the same a mass of deodorizing material in a body and withdrawing the same in a body therefrom, as I have made that the subject-matter of another application, which is a division hereof.

What I claim is—

1. The herein-described process of treating crude petroleum for the obtaining therefrom of an odorless anhydrous oil, it consisting in first heating the petroleum in its natural state until it is freed of water, and afterward introducing anhydrous or unslaked lime, (calcium oxide,) in proportions substantially such as specified, and heating said lime and oil together while entirely isolated from other materials, and finally separating the lime from the oil, whereby the oil is left without any foreign materials therein, as set forth.

2. The herein-described anhydrous, rapidly-drying, odorless, and liquid product of petroleum containing all of the heavier elements of the crude oil, and also lighter elements, to cause the rapid drying of said heavier elements, and being of a dark-brown color tinged with bronze and green, as set forth.

In testimony whereof I affix my signature in presence of two witnesses.

MARTIN CONNELLY.

Witnesses:
H. H. BLISS,
M. P. CALLAN.